Jan. 2, 1923.
F. G. ALBORN.
MOTOR VEHICLE.
FILED MAR. 20, 1920.
1,441,052.
4 SHEETS—SHEET 4.
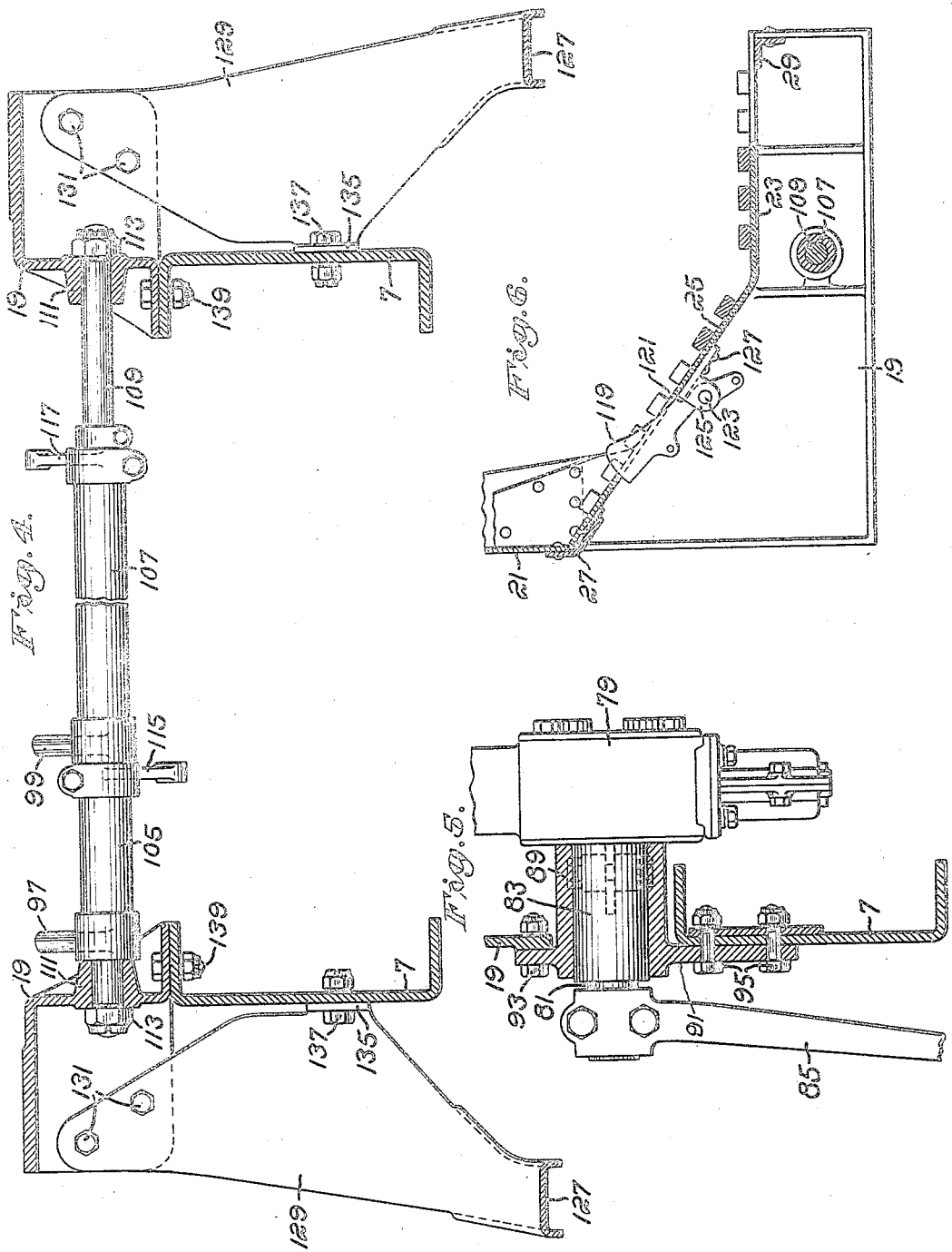
Inventor:
Frans G. Alborn,
by Emery, Booth, Janney, Varney.
Attys.

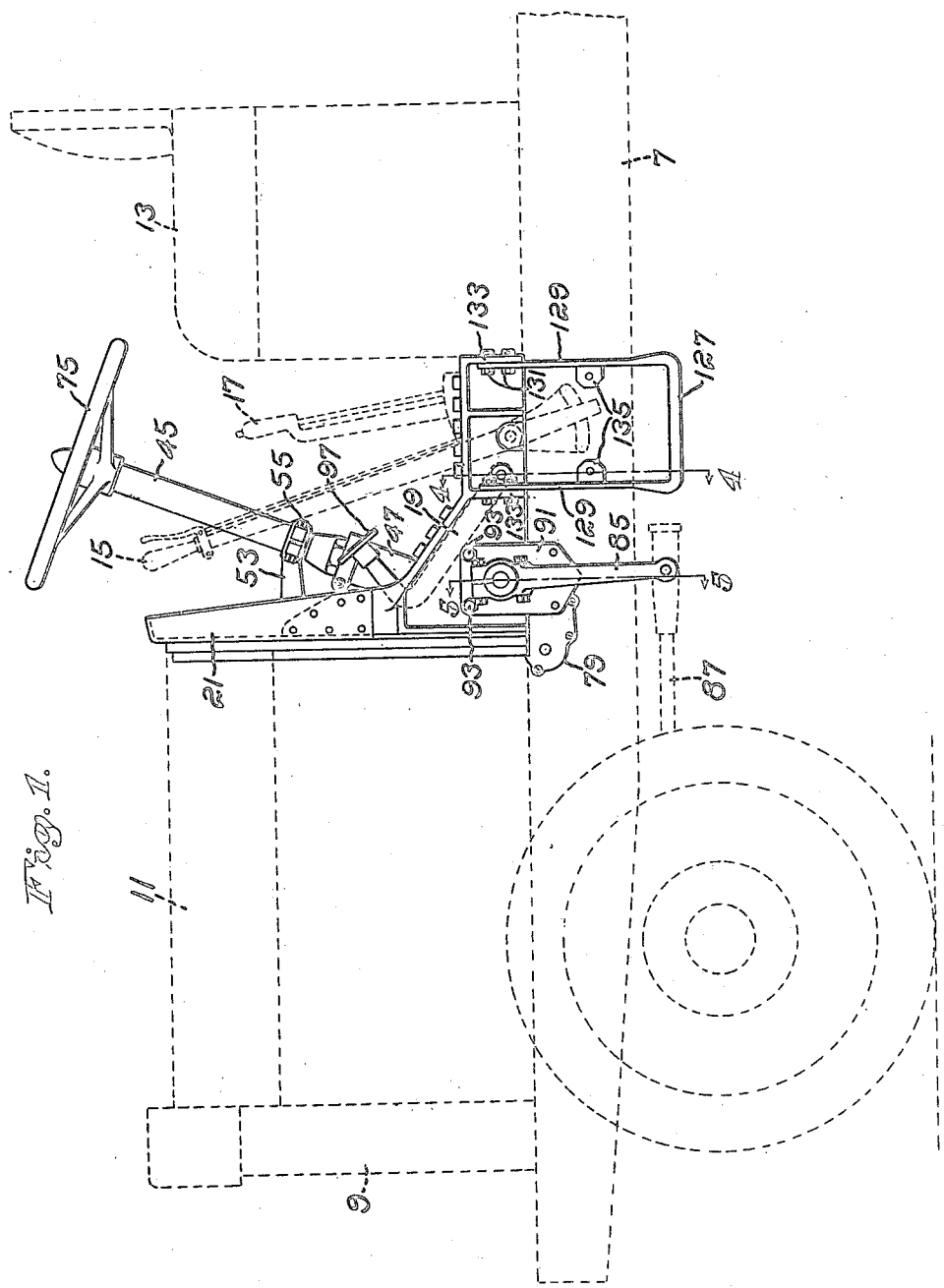

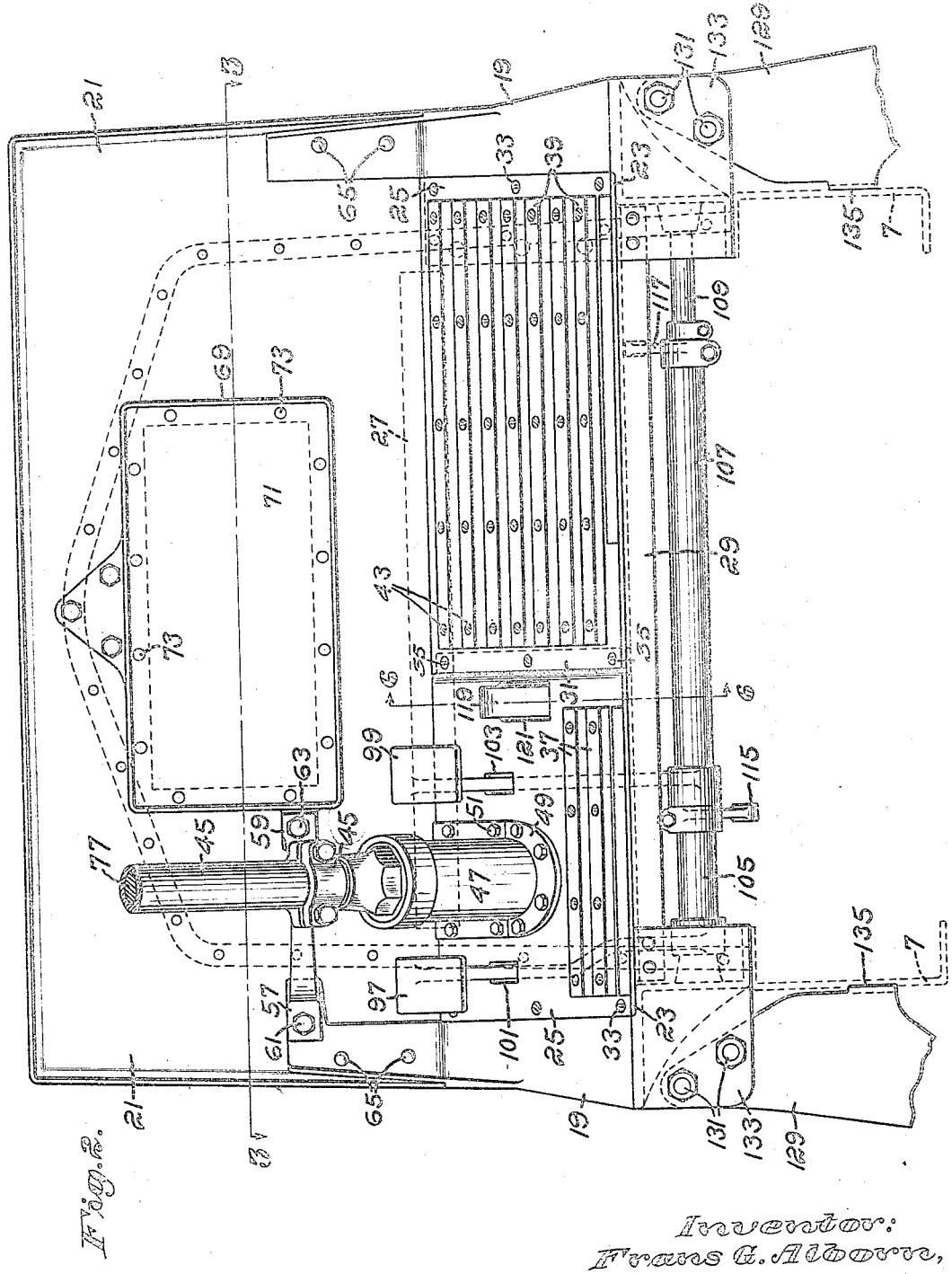

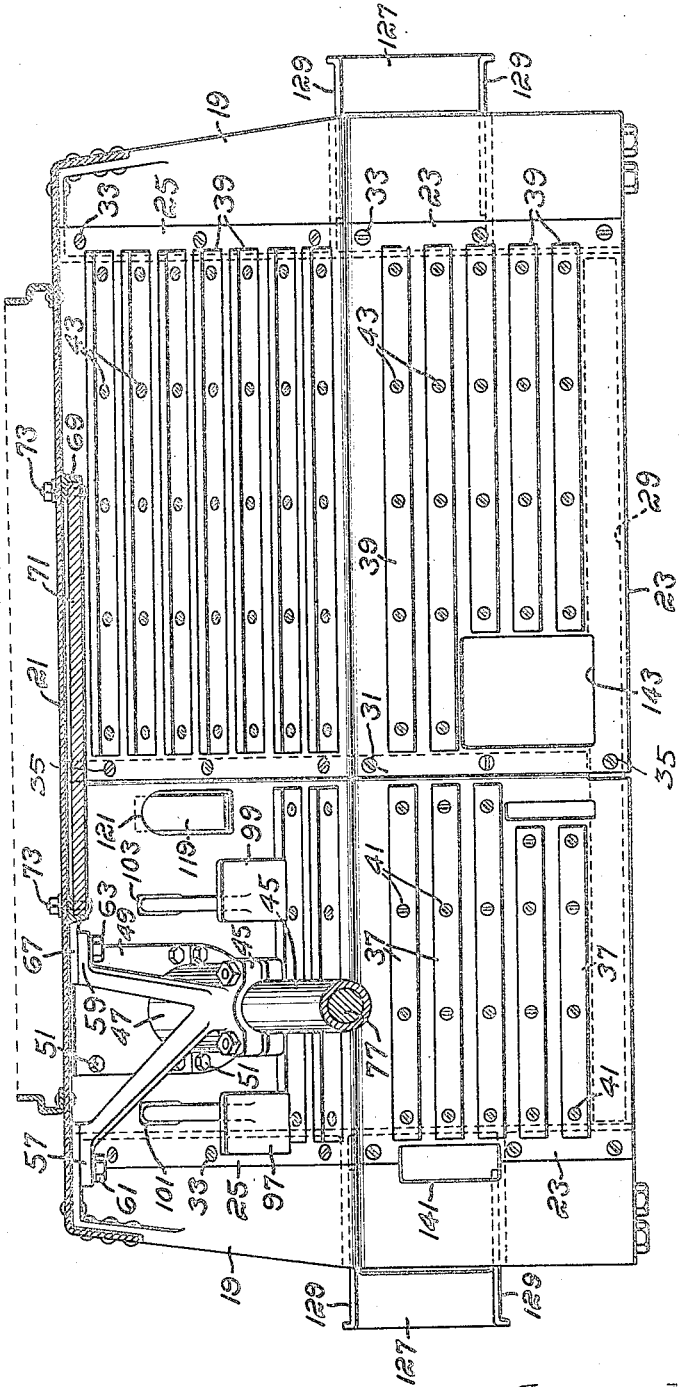

Patented Jan. 2, 1923.

1,441,052

UNITED STATES PATENT OFFICE.

FRANS G. ALBORN, OF MILFORD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

MOTOR VEHICLE.

Application filed March 20, 1920. Serial No. 367,310.

*To all whom it may concern:*

Be it known that I, FRANS G. ALBORN, a citizen of the United States, and a resident of Milford, in the county of New Haven and State of Connecticut, have invented an Improvement in Motor Vehicles, of which the following description, in connection with the accompanying drawings, is a specification, like characters on the drawings representing like parts.

This invention relates to motor vehicles, and aims to facilitate the assembling of the dash-board, floor, steps, steering gear, pedals, and other elements, with the chassis frame, by the provision of a unit which can be assembled and applied as a whole to the main frame during the final assembly.

My invention will be best understood by reference to the following description, when taken in connection with the accompanying drawings of one specific embodiment thereof, while its scope will be more particularly pointed out in the appended claims.

In the drawings:

Fig. 1 is a side elevation of a portion of a motor vehicle exemplifying my invention;

Fig. 2 is a rear elevation of the same on an enlarged scale;

Fig. 3 is a sectional view on line 3—3 of Fig. 2;

Fig. 4 is a sectional view on an enlarged scale on line 4—4 of Fig. 1;

Fig. 5 is a sectional view on an enlarged scale on line 5—5 of Fig. 1; and

Fig. 6 is a sectional view on line 6—6 of Fig. 2.

Referring to the drawings, and to the embodiment of my invention which I have selected for exemplification, I have there shown a portion of a motor vehicle having a chassis frame comprising a pair of longitudinal side members 7, herein having a channel section, said members being shown in full lines in Figs. 4 and 5, but in dotted lines in Figs. 1 and 2. The chassis frame supports a usual radiator 9, bonnet 11, seat 13, hand-brake lever 15, and gear-shifting lever 17. All of these parts may be and are herein of usual construction.

Supported on the chassis frame is an auxiliary frame, herein comprising a pair of side brackets 19 connected to each other by a dash-board 21 and a floor, the latter herein comprising a foot-board 23 and a toe-board 25. Preferably the brackets 19, dash-board 21, floor-board 23 and toe-board 25, are of metallic construction. The brackets are conveniently in the form of castings, while the dash-board, foot-board and toe-board, may be conveniently formed of sheet metal, such as steel. Herein, the brackets are also connected to each other by angle irons 27 and 29 (see Fig. 6), which present supports for the front and rear edges of the toe and foot-boards, respectively, while the side edges are supported by the brackets 19 (see Fig. 2.) Preferably, the floor is formed of two separate plates, which overlap each other as at 31 (see the central portion of Figs. 2 and 3), the left-hand margin of the right-hand plate overlying the right-hand margin of the left-hand plate, thereby to permit the right-hand plate to be removed and replaced, while the left-hand plate is intended to be more or less permanent, since it provides a support for the steering column, as will presently appear. The right and left-hand plates may be appropriately secured to the brackets 19, as by two sets of screws 33, while the overlapping portions of the plates are similarly secured to each other, as by a set of screws 35. The left-hand plate (see Fig. 3) is herein provided with a set of cleats 37 for the feet to rest upon, and the right-hand plate is similarly provided with a set of cleats 39, both suitably secured to the plates, as by screws 41 and 43.

The steering mechanism hereinbefore referred to, in the present example, comprises a steering column 45 having a base 47 provided with a flange 49 suitably secured to the toe-board 25, as by bolts 51. Additional rigidity is given to the steering column by the use of a bracket 53 having a collar portion 55 encircling the steering column, and two base portions 57 and 59 suitably secured to the dash-board 21, as by cap-screws 61 and 63. In the present example, the screw 61 extends into a general prolongation of the left-hand bracket 19 (see Fig. 2), to which the dash-board 21 is secured, as by rivets 65. The cap-screw 63 (see Figs. 2 and 3) extends through the base portion 59 into an ear 67 projecting laterally from a frame 69 which provides a mounting for a removable instrument board 71, the latter being secured in place herein by bolts 73, best shown in Fig. 3. This board may serve as a mounting for the usual instruments, such as speedometer, oil and air pressure gauges, battery, indicator, clock and the like, which may be assembled on the instrument board, prior to the installation of the latter in its frame on the dash-board.

To return to the steering mechanism, the latter has a usual hand-wheel 75 (see Fig. 1), attached to a shaft 77 (see Figs. 2 and 3), which extends downward through the tubular column 45 and into a gear casing 79 (see Fig. 5), which usually contains a worm and worm gear, or a screw and nut mechanism for imparting movement from the shaft 77 to a horizontal shaft 81 which is journaled in a sleeve 83 forming a lateral prolongation of the casing 79. To the outer end of the shaft 81 is secured a usual steering arm 85, which in practice is customarily connected by a drag-link 87, shown in dotted lines in Fig. 1, with one of the steering knuckles, not shown. The sleeve 83 in the present example is mounted in a boss 89, forming a part of a bracket 91, which is secured to the adjacent bracket 19 by bolts 93 (see Fig. 5) and to the channel member 7 of the chassis frame by bolts 95.

The vehicle is provided with usual clutch and brake pedals 97 and 99 (see Fig. 2), which extend through openings 101 and 103 in the toe-board 25, and which are secured to sleeves 105 and 107, respectively (see Fig. 4). These sleeves are mounted to turn on a rod 109, whose terminal portions are supported in the brackets 19, as by providing the latter with bosses 111. The rod is held against lengthwise movement by nuts 113, threaded onto the terminal portions of the rod and abutting against the brackets 19, respectively. In practice, the sleeve 105 will be connected to any usual or desired clutch by suitable connections, including an arm 115 secured to said sleeve (see Fig. 4). Similarly, the sleeve 107 will be connected to the brakes by suitable connections, including an arm 117 secured to said sleeve. The vehicle is also provided with a usual accelerator pedal 119, (see Fig. 6), extending through an opening 121 in the toe-board 25, and mounted on a pivot 123 carried by a bracket 125, the latter being secured to the inside of the toe-board, as by rivets 127. The accelerator pedal will, in practice, be connected by usual connections to the throttle valve of the engine.

The vehicle is herein provided with a pair of steps 127 (see Figs. 1 and 4), preferably made of pressed sheet metal of generally U-shaped form, each having a pair of arms 129 extending in an upward direction, and secured to the adjacent bracket 19, as by bolts 131, extending through flanges 133 formed on each bracket. The arms 129 are herein provided (see Figs. 1 and 4) with ears 135 secured to the channel members 7 of the chassis frame by bolts 137. The brackets 19 are likewise secured to the channel members 7 by bolts 139 (see Fig. 4).

By simply removing the bolts 95 (see Fig. 5), the bolts 137 and the bolts 139 (see Fig. 4), and detaching the brake, clutch and accelerator pedals, and steering arms, as well as any other similar connections, the auxiliary frame may be lifted from its place as a unit. In this connection, it should be noted that the foot-board 23 is provided with openings 141 and 143 (see Fig. 3) for the brake and gear-shifting levers 15 and 17, respectively. By simply placing these levers upright, the auxiliary frame may be easily removed and replaced without interference.

It should now be evident that the auxiliary frame and the parts which it supports may be assembled as a unit wherever may be convenient in the factory. This greatly facilitates the assembling of the parts in question, because they are much more accessible than would be the case if it were necessary to assemble them individually on the chassis frame. When the unit is completely assembled, it may be sent to the main assembly point and dropped into place on the chassis frame, to which it is then secured by the bolts 95, 137 and 139. It must be evident that, by this means, the assembling operations can be accomplished much more conveniently and expeditiously than would otherwise be possible.

Having thus described one embodiment of my invention, but without limiting myself thereto, what I claim and desire by Letters Patent to secure is:

1. In a motor vehicle, the combination with a chassis frame, of a readily attachable and detachable unit mounted thereon, said unit including a pair of side brackets, a dashboard, a foot-board and a toe-board connecting said side brackets, a pair of steps secured to said brackets, respectively, a steering gear supported by said toe-board, and a set of pedals supported by said brackets.

2. In a vehicle, the combination of a chassis frame comprising a pair of longitudinal side members, a pair of brackets supported on said members, a transverse rod presenting a tie-piece connecting said brackets, and a pedal supported by said rod.

3. In a vehicle, the combination of main and auxiliary frames, said auxiliary frame being superimposed upon said main frame and carrying steps depending on opposite sides of the exterior of said main frame.

4. In a vehicle, the combination of main and auxiliary frames, the latter being superimposed upon the former, said main frame comprising a pair of longitudinal members, and said auxiliary frame comprising a pair of brackets supported on said members, respectively, and a pair of steps depending from said brackets on the outer sides of said longitudinal members.

In testimony whereof, I have signed my name to this specification.

FRANS G. ALBORN.